US008332105B2

(12) United States Patent
Laux

(10) Patent No.: US 8,332,105 B2
(45) Date of Patent: Dec. 11, 2012

(54) METHOD AND SYSTEM FOR CONTROLLING COMPACTION MACHINES

(75) Inventor: Robert Laux, Neuwied (DE)

(73) Assignee: BOMAG GmbH, Boppard (DE)

( * ) Notice: Subject to any disclaimer, the term of this patent is extended or adjusted under 35 U.S.C. 154(b) by 1020 days.

(21) Appl. No.: 12/107,679

(22) Filed: Apr. 22, 2008

(65) Prior Publication Data

US 2008/0286044 A1 Nov. 20, 2008

(30) Foreign Application Priority Data

Apr. 22, 2007 (DE) ......................... 10 2007 018 743

(51) Int. Cl.
*E01C 7/06* (2006.01)
*E01C 7/32* (2006.01)
*E01C 19/30* (2006.01)
*G06F 7/70* (2006.01)
*G06F 19/00* (2006.01)

(52) U.S. Cl. ........................ 701/50; 404/133.05; 404/75

(58) Field of Classification Search .................... 701/50; 404/133.05, 133.1, 133.2, 83, 72, 75
See application file for complete search history.

(56) References Cited

FOREIGN PATENT DOCUMENTS

| | | | |
|---|---|---|---|
| DE | 3308476 | A1 | 10/1983 |
| EP | 0688379 | B1 | 3/1994 |
| EP | 1705293 | A | 9/2006 |
| EP | 1 897 996 | A | 3/2008 |
| JP | 11-117280 | | 4/1999 |
| JP | 2002-363963 | | 12/2002 |
| JP | 2004-085201 | | 3/2004 |
| WO | 0225015 | A1 | 3/2002 |

*Primary Examiner* — Christopher J. Novosad
(74) *Attorney, Agent, or Firm* — Baker & Hostetler LLP

(57) ABSTRACT

A method and a system is described for controlling at least one compaction machine in which the oscillations propagating from the compaction machine in the ground are detected by means of a sensor at least at one relevant measuring location. The measured oscillation values as detected by the sensor are sent to a data-processing unit which then compares the same with a permissible oscillation limit value for the respective measuring location. Upon exceeding the limit value, at least one compaction parameter of the compaction machine is changed in such a way that the measured oscillation values as measured at the measuring location are set by a control loop circuit automatically to a value smaller than or equal to the oscillation limit value.

9 Claims, 3 Drawing Sheets

METHOD AND SYSTEM FOR CONTROLLING COMPACTION MACHINES

FIELD OF THE INVENTION

The invention relates to a method for controlling a compaction machine for the purpose of automatic adjustment of compaction parameters of said compaction machines and relates especially to a respective system for controlling such a compaction machine.

BACKGROUND OF THE INVENTION

Compaction machines or devices of the respective kind are used for compacting soil, grounds, traffic routes, dams and the like. Such compaction machines are known in different embodiments from the state of the art. These can concern for example, but not exclusively, automotive rollers or towed rollers. The invention must be distinguished from apparatuses (such as rams or beetle heads) for driving land ties and the like into the ground.

In order to improve the compaction effect and for increasing the degree of compaction, a vibration superimposition or oscillation excitation of the compaction tools is known, for which reference is made in lieu to DE 33 08 476 A1. The respective compaction machine is then provided with a vibration plate or roller, as described in WO 02/25015 A1.

A relevant problem in this respect is that the compaction machine per se as well as structures in the surrounding area can be damaged by the oscillations. This is especially problematic in cases where the frequency of the oscillation excitation lies in the range of the local natural frequency of the machine or the ground, or when large oscillation amplitudes are applied. It is therefore known from the state of the art to detect the oscillations and to correct them optionally via a control circuit in order to also prevent any undesirable "jumping" of the machine. Such a feedback control is described in EP 0 688 379 B1 and the already mentioned WO 02/25015 A1. The compaction machine or the compaction tool is equipped with sensors for detecting the oscillations. The oscillations in the ground per se or the surrounding structures are not considered.

It is the object of the invention to provide a method for controlling a compaction machine and a respective system with which the same can be operated with high efficiency concerning the compaction effect and the degree of compaction, and with which adjacent structures are not stressed more than permitted by vibrations at the same time.

This object is achieved by a method according to claim 1 and by a system according to the independent claim. Advantageous further developments are the subject matter of the respective dependent claims.

The method in accordance with the invention provides that the oscillations emitted by the compaction machine and propagating the ground are detected in at least one relevant measuring location by means of at least one sensor and the measured oscillation values as detected by the sensor are sent to at least one data-processing unit (9) which compares these with a permissible oscillation limit value for the respective measuring location. When the permissible limit value for the respective measuring location is exceeded, it is provided to change at least one compaction parameter automatically, i.e. in a control circuit, with the objective to set the oscillation values measured at the measuring location to a value smaller than or equal to the oscillation limit value, or to influence the compaction parameter in such a way that the maximum detected measured oscillation value is smaller than or equal to the oscillation limit value.

Compaction parameters shall be understood within the terms of the patent application as being a physically detectable variable which has influence on the compaction effect or the degree of compaction. The compaction parameter is preferably taken from a group which comprises the oscillation amplitude of the compaction tool, the direction of action of said amplitude, the different directional portions of said oscillation, the frequency of the oscillation or also the speed of displacement or mass of the compaction machine.

A relevant advantage of the method in accordance with the invention is that the measurement occurs directly on the relevant or interesting measuring location, i.e. usually directly in a structure. Local and momentary properties of the ground thus have no influence on the measured oscillation values as detected in the structure. An imprecise determination of load on the basis of any inverse calculation or projection with ground parameters (such as oscillation propagation velocity and damping) which cannot be specified more closely can be omitted.

This means that the compaction machine can be operated with very high efficiency concerning compaction effect and degree of compaction. At the same time, the surrounding structures and especially those susceptible to oscillations can be protected in the best possible way against vibrations, such that they are subjected to oscillations to an extent not more than is permissible.

The system in accordance with the invention comprises at least one sensor for detecting an oscillation caused by and emitted from the compaction machine and at least one data-processing unit which compares the measured oscillation values sent by the at least one sensor with a permissible oscillation limit value. When the limit value is exceeded, the data-processing unit initiates the change of at least one compaction parameter of the compaction machine. The at least one sensor is arranged in the area of a structure in the ground or on the structure itself in order to directly detect the oscillations occurring at the measuring location.

Reference is hereby made substantially to the discussion above in connection with the control method concerning the advantages of such a system.

In an especially preferred further development of the invention, for which protection is hereby filed optionally, it is provided that several compaction machines are operated at a construction site. The position of each compaction machine is detected absolutely or at least relatively with respect to the position of the sensors. Furthermore, a data-processing unit is associated with each individual compaction machine which analyzes the measured oscillation data of all sensors and calculates on the basis of the known position of the compaction machine which sensors and which measuring locations are relevant for the respective compaction machine and which are not. In the event that a measured oscillation value exceeds the permissible limit value at a measuring location relevant for the compaction machine, the data-processing unit will initiate a respective change of at least one compaction parameter with the respective compaction machine. An especially advantageous further development provides that all compaction machines are controlled by only one central data-processing unit, with each machine being provided itself with a data-processing unit, especially when the positional data are evaluated which are received by a navigation system such as GPS.

Several embodiments of the invention and their advantages are described below by reference to the drawings. Features which are only shown in connection with one embodiment shall also apply as general features of the invention, within the scope of what is technically feasible.

DETAILED DESCRIPTION

Figure 1:
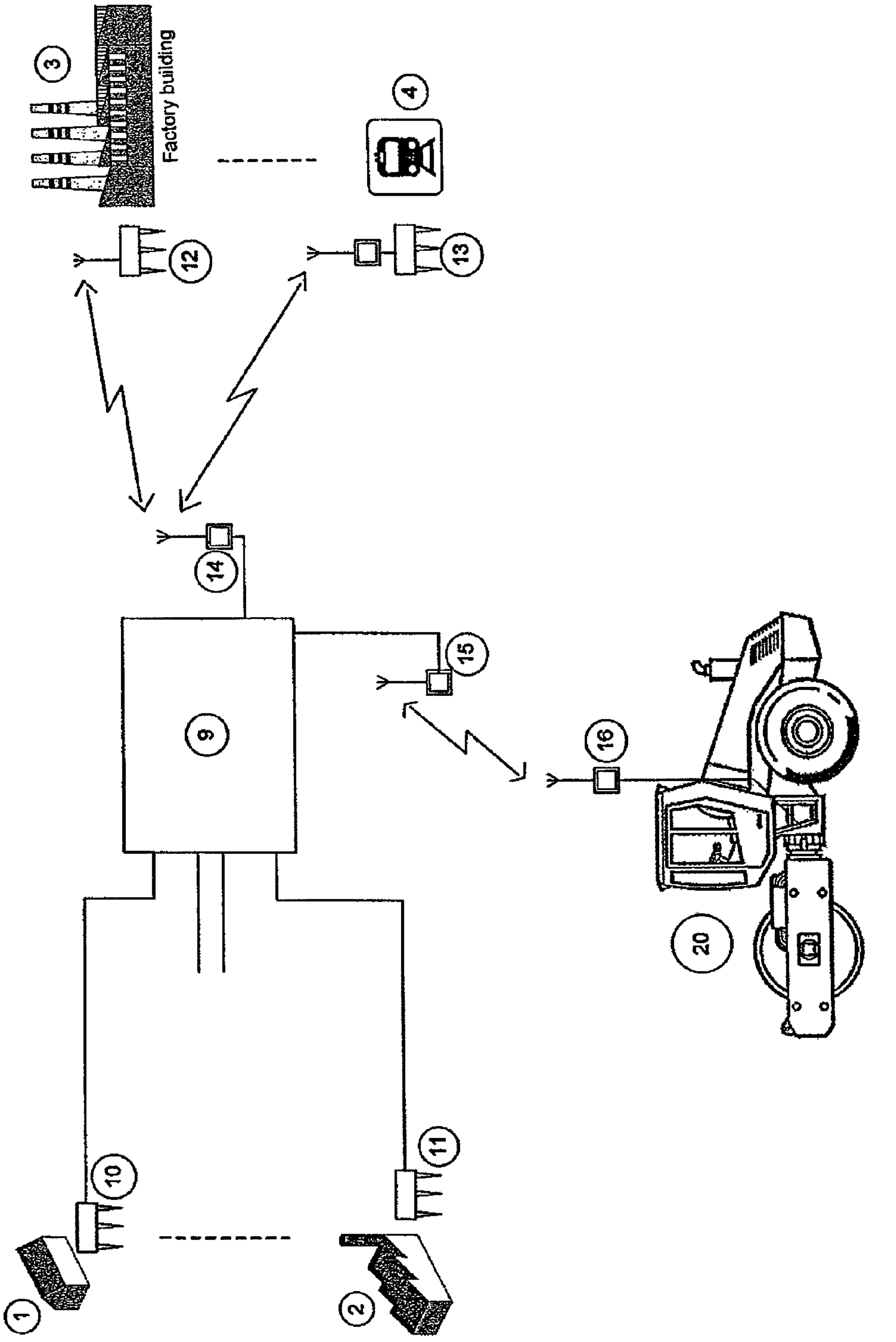
FIG. 1 shows an embodiment of the system in accordance with the invention in a schematic view.

The embodiment according to FIG. 1 comprises a compaction machine 20 which is arranged as a roller machine. It is preferably used in earthwork and asphalt construction for compaction of the ground. It can naturally also concern a plate compactor or another configuration. The compaction machine 20 is controlled by a data-processing unit 9. Several sensor or building sensors are arranged in the area of the construction site for detecting oscillations or vibrations on the building structures. Sensor 10 is arranged on a residential building 1 and sensor 11 on a factory building 2. Both sensors 10 and 11 send the detected measured oscillation values to the data processing unit 9 which is arranged in this case simultaneously as a data acquisition unit. Data transmission occurs via a cable connection. Furthermore, a sensor 12 is arranged in a factory building 3 and a sensor 13 in the area of a train tunnel 4. The train tunnel stands as an example for other comparable structures such as road tunnels, line conduits, sewers, etc. A sensor can also be arranged on a bridge, a tower, a monument or the like. The data transmission by sensors 12 and 13 occurs via a radio connection, for which purpose the data-acquisition and data-processing unit 9 is equipped with a radio cell 14. A one-directional data transmission from sensors 10 to 13 to the data-acquisition and data-processing unit 9 is sufficient. The number of the sensors shown here is obviously only shown as an example. It is provided in accordance with the invention that the number of sensors is unlimited. Several sensors even for different types of measurement are possible at a measuring location.

The sensors 10 to 13 are arranged in the ground. It is understood that it is also possible to provide a direct arrangement on the respective objects (buildings or the like). The sensors can be acceleration sensors or seismographic sensors.

The measured oscillation values sent by the sensors 10 to 13 to the data-processing and data-acquisition unit 9 are compared there with the permissible limit values for the respective object at the respective measuring location. Permissible limit values are contained in the norm DIN 4150 for example, or are determined beforehand by a structural engineer. The following conditions are principally distinguished during the comparison:

Measured value is smaller than limit value.

Measured value is equal to limit value.

Measured value is larger than limit value.

It is principally not necessary that a new changed value is calculated by the data-processing unit 9. The evaluation and comparison of the measured values with the limit value is sufficient. The result is then transmitted whether the measured values are over or under the limit value or equal to the limit value. Depending on this, the control unit of the machine will accordingly reduce, increase or keep constant the compaction parameters.

In the example as described here, the data-acquisition and data-processing unit 9 will determine or calculate a new changed value for at least one compaction parameter for the compaction machine 20 (e.g. oscillation amplitude, direction of action of oscillation, percentages of direction of action of amplitude, frequency, displacement velocity, etc.) and send it to the same. The transmission occurs by radio, for which purpose the data-acquisition and data-processing unit 9 is equipped with a second radio cell 15 and the compaction machine with a corresponding radio cell 16. The use of two independent radio technologies in the data-acquisition and data-processing unit 9 is not mandatory necessary. The adjustment or change of the at least one compaction parameter occurs in a control loop circuit with the goal to load the respective object with oscillations to an extent not more than necessary and to simultaneously operate the compaction machine with high efficiency with respect to compression of the ground and depth effect (compaction effect and degree of compaction). There is therefore a feedback control to a locally possible maximum. Depending on the adjustment of the control loop circuit, it is possible to change only one compaction parameter, or several compaction parameters can be changed simultaneously or successively.

For documentation and as a measure of quality assurance, but also for reasons of warranty, it is provided to record the measured oscillation values of the sensors 10 to 13. Electronic as well as conventional writing systems (paper printout) are possible as recording methods. It is also provided to document the compaction parameters of the compaction machine 20 and their change by the control unit. It can thus also be documented that the compaction machine has responded to the detected measured oscillation values. For this purpose, the data transmission between the compaction machine 20 and the data-acquisition and data-processing unit 9 is of a bi-directional nature. The storage of the data can occur in the data-acquisition and data-processing unit 9 for example.

The data-acquisition and data-processing unit 9 which controls the compaction machine 20 is arranged or erected in a stationary on site, i.e. in the area of the construction site. It is understood that a decentralized arrangement of the same is possible, e.g. at the headquarters of the construction company or the maker of the compaction machine 20 (or a service provided for the control unit). Data transmission between the sensors and the unit 9 and between compaction machine 20 and unit 9 is then performed via radio.

Figure 2:
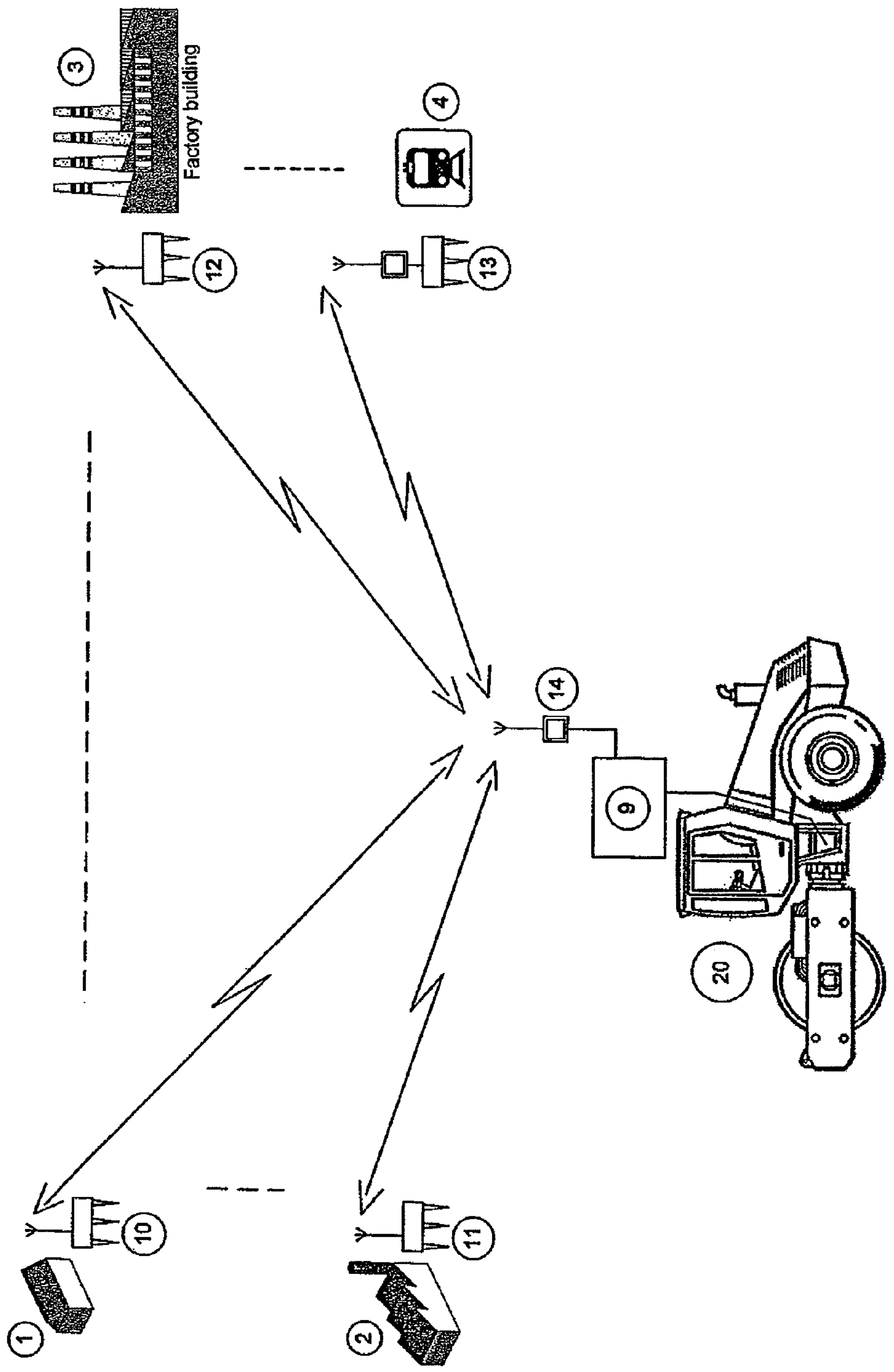
FIG. 2 shows a modification of the system according to FIG. 1, in which the data-processing unit is arranged directly on a compaction machine.

It is further possible to arrange the data-acquisition and data-processing unit 9 directly on the compaction machine 20. This is shown in FIG. 2. A relevant advantage in this case is the omission of the radio link between the unit 9 and the compaction machine 20. Moreover, the system and unit will become better adapted to the construction site because the stationary erection of the unit 9 on site can be omitted. In this principle, an exclusive radial transmission between the sensors 10 to 13 and the unit 9 (with its radio cell 14) is advantageous, which means that only such sensors are used which have a respective radio technology.

Figure 3:
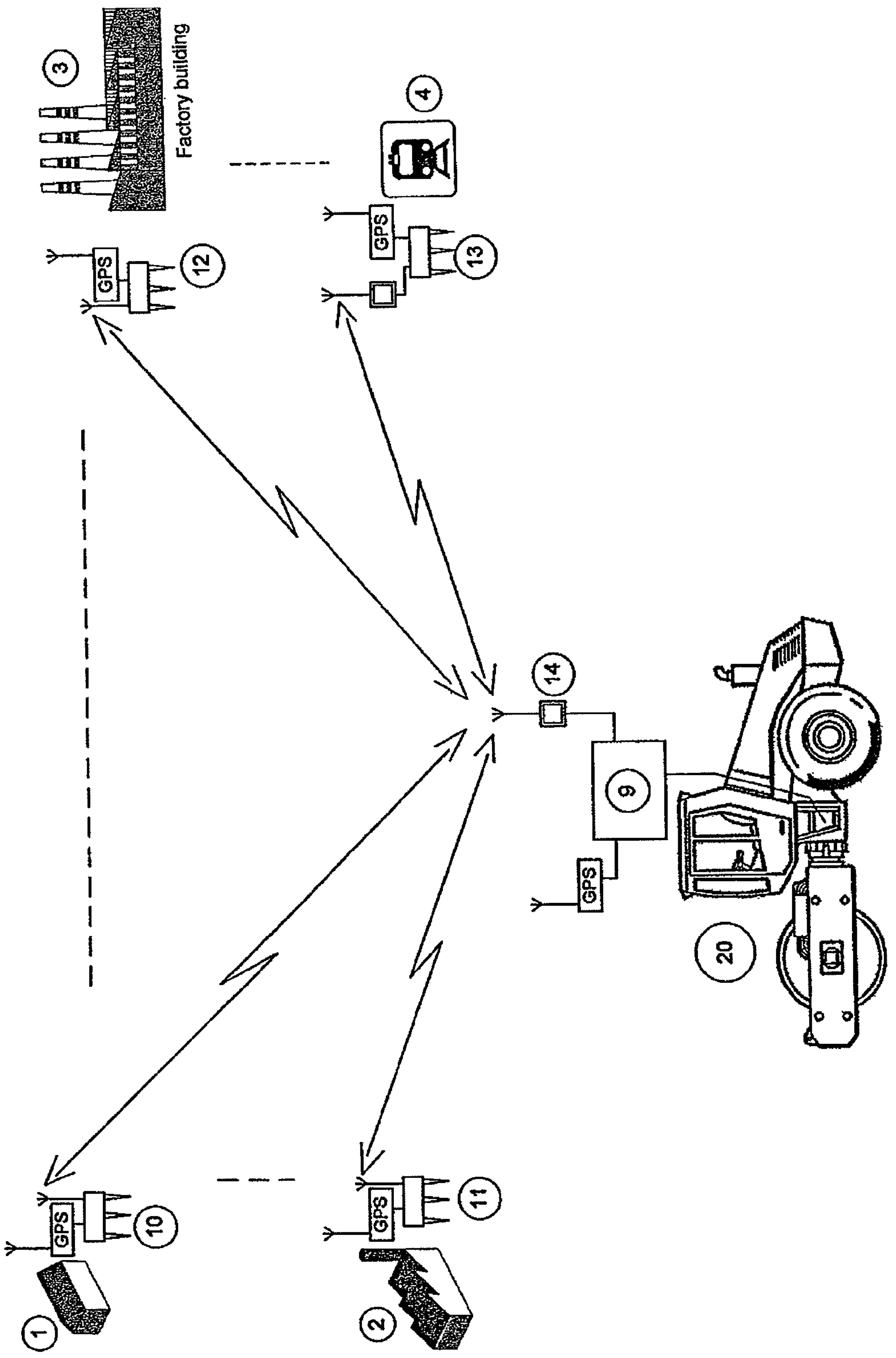
FIG. 3 shows a modification of the system according to FIG. 2, in which the sensors and the compaction machines are equipped with GPS receivers.

If it is intended to use several compaction machines 20 on a construction site, the embodiment according to FIG. 3 is especially advantageous. In comparison to FIG. 2, all sensors 10 to 13 and the compaction machine or machines 20 (which continually change their position as a result of their movement) are equipped with the technical possibility to determine their momentary position, which occurs here in an exemplary manner by means of GPS receiver technology. Concerning the sensors which are usually stationary, it would alternatively also be possible to determine their position once and to enter this in the data-acquisition and data-processing unit 9.

It is provided for in accordance with the invention that each of the compaction machines 20 is equipped with a data-acquisition and data-processing unit 9. The units 9 will now receive the measured oscillation values of the sensors 10 to 13 and simultaneously the position where such measured values are detected. It is thus possible to determine and calculate by the known own position of the compaction machine 20 which critical measured oscillation values are relevant for the respective compaction machine in order to respond thereto with the change of at least one compaction parameter. It is thus possible to use any random number of compaction machines at the construction site.

In an alternative embodiment, only one data-acquisition and data-processing unit 9 is provided which controls all compaction machines. It can be arranged in a decentralized manner or on site at the construction site. Its arrangement on a compaction machine is possible which then acts as a master machine for the other compaction machines (which moreover may have a different configuration).

What is claimed is:

1. A method for controlling at least one ground compaction machine, comprising:

detecting oscillations, emitted by a ground compaction machine, at different measuring locations by at least one sensor located proximate to a structure in the ground or disposed on the structure, sending measured oscillation values, detected by the sensor, to at least one data-processing unit, comparing the measured oscillation values with an oscillation limit value for the measuring location, and upon exceeding the oscillation limit value, changing at least one compaction parameter to reduce the measured oscillation values to a value smaller than or equal to the oscillation limit value.

2. A method according to claim 1, wherein the measured oscillation values are stored for documentation purposes.

3. A method according to claim 1, wherein the compaction parameters are stored for documentation purposes.

4. A method according to claim 1, wherein the compaction parameter is selected from a group consisting of amplitude, direction of action of the amplitude, vertical share of the amplitude, frequency of the oscillation or speed of displacement of the compaction machine.

5. A method according to claim 1, wherein data transmission occurs between the sensor and the data-processing unit or between the data-processing unit and the ground compaction machine.

6. A method according to claim 1, wherein, when a plurality of ground compaction machines are used, each ground compaction machine is equipped with and controlled by a data-processing unit.

7. A method according to claim 1, further comprising:

detecting a momentary position of the ground compaction machine, sending the detected position to an associated data-processing unit, and determining which measured sensor values are relevant for the compaction machine in order to change said compaction parameter.

8. A method according to claim 5, wherein the position of the ground compaction machines is detected using a GPS receiver.

9. A method according to claim 1, wherein, when a plurality of ground compaction machines are used, the ground compaction machines are controlled by a common data-processing unit.

* * * * *